UNITED STATES PATENT OFFICE.

ADOLPH SOMMER, OF BERKELEY, CALIFORNIA.

PROCESS OF NEUTRALIZING SULPHO-CHLORINATED OILS.

SPECIFICATION forming part of Letters Patent No. 451,531, dated May 5, 1891.

Application filed September 3, 1890. Serial No. 363,837. (No specimens.) Patented in England September 4, 1888, No. 12,795; in France September 4, 1888, No. 192,770; in Belgium September 4, 1888, No. 83,139; in Germany September 5, 1888, No. 50,282; in Austria-Hungary October 3, 1889, No. 24,316 and No. 29,485, and in Canada February 4, 1890, No. 33,576.

*To all whom it may concern:*

Be it known that I, ADOLPH SOMMER, a citizen of the United States, and a resident of Berkeley, in the county of Alameda and State of California, have invented a new and useful Improvement in Rendering the Sulpho-Chlorides of Oils Neutral and Drying, (for which I have obtained Letters Patent in England, No. 12,795, September 4, 1888; in France, No. 192,770, September 4, 1888; in Belgium, No. 83,139, September 4, 1888; in Germany, No. 50,282, September 5, 1888; in Austria-Hungary, No. 24,316 and No. 29,485, October 3, 1889, and in Canada, No. 33,576, February 4, 1890;) and I do declare that the following is an exact description of the invention, which will enable others skilled in chemical manipulations to produce the same results.

In a previous patent, No. 389,020, of September 4, 1888, for a process of making neutral compounds of chloride of sulphur, I have shown that by incorporating with the fat or oil to be treated a small percentage of calcium hydrate previous to the admixture of the chloride of sulphur a neutral compound is obtained. Now I find that certain manganese compounds share with the aforementioned calcium hydrate the property of neutralizing the acids formed by the action of chloride of sulphur upon fats and oils without decomposing the chloride of sulphur, and that they, furthermore, impart to the sulpho-chlorides of those oils which are vulcanizable—that is to say, those oils which can be converted into hard solid masses by the addition of a sufficient quantity of chloride of sulphur—the property of readily hardening and drying on exposure to the air. I therefore avail myself of this twofold action of manganese in the manufacture of preparations from oils that are intended to be used for the coating or painting of exposed surfaces. The manganese compounds which I prefer for this purpose are its oxides; but certain of its salts in which the metal is combined with weak acids—as, for instance, the carbonate and borate—I find also suitable. The oxides or other compounds of manganese do not have to be in the pure state. The native oxides—as, for instance, pyrolusite or a precipitated oxide, such as that which is obtained in Weldon's process for recovering manganese—are applicable. It is, however, necessary that the manganese compound be in a finely-divided and perfectly dry state.

According to the degree of fineness of the manganese compound or the intensity of drying property desired in the product, the proportion of the compound to be employed may vary from twenty-five to one hundred per cent. of the weight of the chloride of sulphur used.

The manner in which the operation is carried out is as follows: The required quantity of pyrolusite or other manganese compound is intimately mixed with the oil to be treated, the mixture, if necessary, cooled to that temperature at which the oil can be mixed with chloride of sulphur without detriment to the product, the chloride of sulphur added, and the mixture stirred until the smell of chloride of sulphur has disappeared.

Having thus described the invention, what I claim, and desire to secure by Letters Patent, is—

The process of rendering the sulpho-chlorides of oils both neutral and drying, which consists in incorporating with the oil, previous to the addition of the chloride of sulphur, an oxide or other compound of manganese, substantially as set forth.

ADOLPH SOMMER.

Witnesses:
JOHN H. GRAY, Jr.,
JOSEPH LE CONTE.